US012066154B2

(12) United States Patent
Sbarsi et al.

(10) Patent No.: US 12,066,154 B2
(45) Date of Patent: Aug. 20, 2024

(54) RECOMPRESSED TRANSCRITICAL CYCLE WITH VAPORIZATION IN CRYOGENIC OR LOW-TEMPERATURE APPLICATIONS, AND/OR WITH COOLANT FLUID

(71) Applicant: SAIPEM S.P.A., San Donato Milanese (IT)

(72) Inventors: Massimiliano Sbarsi, San Donato Milanese (IT); Lucio Aurilio, San Donato Milanese (IT); Anton Marco Fantolini, San Donato Milanese (IT); Salvatore De Rinaldis, San Donato Milanese (IT)

(73) Assignee: SAIPEM S.P.A., San Donato Milanese (IT)

( * ) Notice: Subject to any disclaimer, the term of this patent is extended or adjusted under 35 U.S.C. 154(b) by 431 days.

(21) Appl. No.: 17/598,773

(22) PCT Filed: Mar. 18, 2020

(86) PCT No.: PCT/IB2020/052455
§ 371 (c)(1),
(2) Date: Sep. 27, 2021

(87) PCT Pub. No.: WO2020/201871
PCT Pub. Date: Oct. 8, 2020

(65) Prior Publication Data

US 2022/0186884 A1 Jun. 16, 2022

(30) Foreign Application Priority Data

Mar. 29, 2019 (IT) ........................ 102019000004727

(51) Int. Cl.
*F17C 9/02* (2006.01)
*F17C 5/06* (2006.01)

(52) U.S. Cl.
CPC .................. *F17C 9/02* (2013.01); *F17C 5/06* (2013.01); *F17C 2221/033* (2013.01);
(Continued)

(58) Field of Classification Search
CPC ........ F17C 9/02; F17C 5/06; F17C 2221/033; F17C 2223/0161; F17C 2223/033;
(Continued)

(56) References Cited

U.S. PATENT DOCUMENTS 4,995,234 A * 2/1991 Kooy ...................... F01K 25/10 60/659
8,132,412 B2 * 3/2012 Bennett ................. B64C 39/024 60/682
2011/0289941 A1 12/2011 Gonzalez Salazar et al.

FOREIGN PATENT DOCUMENTS

ES 2479240 B2 2/2015
WO 2018100522 A1 6/2018

OTHER PUBLICATIONS

International Search Report and Written Opinion, issued in PCT/IB2020/052455, mailed Jul. 6, 2020, 9 pages.

* cited by examiner

*Primary Examiner* — Nelson J Nieves
*Assistant Examiner* — Matthew John Moscola
(74) *Attorney, Agent, or Firm* — Armstrong Teasdale LLP

(57) ABSTRACT

A process for regasifying a fluid and generating electrical energy includes subjecting an operating fluid to 1) pumping, the pumping step including a low pressure pumping step 1a) and a high pressure pumping step 1b), 2) heating in a recuperator to obtain a heated flow, the heating step including a low temperature heat recovery step 2a) and a high temperature heat recovery step 2b), 3) further heating through a high temperature source to obtain a further heated flow, 4) expanding in a turbine, with generation of electrical
(Continued)

energy to obtain an expanded flow, 5) cooling by heat exchange to obtain a cooled flow, and 6) condensing the flow of the operating fluid and regasifying the fluid. After low pressure pumping, a portion of the flow of the operating fluid is subjected to recompression to obtain a flow combined with the flow of the operating fluid obtained from step 2a).

11 Claims, 7 Drawing Sheets

(52) U.S. Cl.
CPC ................. *F17C 2223/0161* (2013.01); *F17C 2223/033* (2013.01); *F17C 2227/0135* (2013.01); *F17C 2227/0323* (2013.01); *F17C 2227/0327* (2013.01); *F17C 2227/0362* (2013.01); *F17C 2260/046* (2013.01); *F17C 2265/05* (2013.01)

(58) Field of Classification Search
CPC ...... F17C 2227/0135; F17C 2227/0323; F17C 2227/0327; F17C 2227/0362; F17C 2260/046; F17C 2265/05; F01K 7/32; F01K 19/04; F01K 25/103; F22B 3/08
USPC .................................................... 60/671, 651
See application file for complete search history.

RECOMPRESSED TRANSCRITICAL CYCLE WITH VAPORIZATION IN CRYOGENIC OR LOW-TEMPERATURE APPLICATIONS, AND/OR WITH COOLANT FLUID

CROSS-REFERENCE TO RELATED APPLICATIONS

This application is a National Phase Application of PCT International Application No. PCT/IB2020/052455, having an International Filing Date of Mar. 18, 2020, which claims priority to Italian Application No. 102019000004727, filed Mar. 29, 2019, each of which is hereby incorporated by reference in its entirety.

TECHNICAL FIELD OF THE INVENTION

The present invention applies to the energy field, in particular for improving the energy efficiency of plants for regasifying liquefied natural gas.

BACKGROUND ART

Technologies are known for regasifying liquefied gases, such as liquefied natural gas (LNG), for example.

The liquefied natural gas is a mixture of natural gas mainly consisting of methane and, to a lesser extent, of other light hydrocarbons, such as ethane, propane, iso-butane, n-butane, pentane, and nitrogen, which is converted from the gaseous state, in which it is at ambient temperature, to the liquid state, at about −160° C., to allow the transport thereof.

Liquefaction plants are located close to natural gas generating sites, while regasifying plants (or "regasifying terminals") are located close to the users.

Most of the plants (about 85%) is located onshore, while the remaining part (about 15%) is located offshore on platforms or ships.

It is common for each regasifying plant to comprise several regasifying lines in order to meet the liquefied natural gas load or requirements, as well as for reasons of flexibility or technical need (for example, for line maintenance).

Usually, the regasifying technologies involve liquefied natural gas stored in tanks at atmospheric pressure at the temperature of −160° C. and comprise the steps of compressing the fluid up to about 70 to 80 bar and vaporization and superheating up to about 3° C.

The thermal input required for regasifying 139 t/h is about 27 MWt, while the electric one is about 2.25 MWe (4.85 MWe if the other auxiliary loads of the plant are considered; maximum 20 MWe electric load of the plant on 4 regasifying lines in operation).

The most used regasifying technologies, individually or combined with each other, comprise the Open Rack Vaporizer (ORV) technology, employed in about 70% of the regasifying terminals (in the world), and the Submerged Combustion Vaporizer (SCV).

Other technologies employ the Intermediate Fluid Vaporizer (IFV) or the Ambient Air Vaporizer (AAV).

Open Rack Vaporizer (ORV)

This technology provides for the natural gas in the liquid state (about 70 to 80 bar and at the temperature of −160° C.) to be flown from the bottom upwards in aluminum pipes placed side-by-side to form panels; the vaporization progressively occurs as the fluid proceeds.

The heat carrier is seawater which flowing from the top downwards over the outer surface of the pipes, provides the heat required for the vaporization by difference in temperature.

In particular, the heat exchange is optimized by the design of the profile and the surface roughness of the pipes, which create a homogenous distribution of the thin seawater film over the panel.

Submerged Combustion Vaporizer (SCV)

Such a technology utilizes a demineralized water bath heated by an immersed flame burner as heat carrier; in particular, the Fuel Gas (FG) is burned in the combustion section and the fumes generated pass through a coil of perforated pipes from which the combusted gas bubbles passes outside, which combusted gas bubbles heat the water bath by also yielding the condensation heat.

The liquefied natural gas (LNG) vaporizes in another coil of stainless steel pipes immersed in the same demineralized and heated water bath.

The same water of the bath is kept in circulation in order to ensure a homogenous temperature distribution.

The exhausted fumes instead are discharged from the exhaust gas stack of the SCVs.

Organic Rankine Cycle

The Organic Fluid Rankine Cycles (ORCs) are widely used in the geothermal field and for biomass applications or for Waste Heat Recovery from industrial processes.

Such cycles provide the possibility of selecting the operating fluid from a broad variety of candidate fluids and allows efficient thermodynamic cycles to be obtained, also for low temperatures of the heat source and for little availability of thermal energy.

Moreover, the selection of a low boiling fluid allows a condensing cycle at cryogenic temperatures to be achieved without problems of freezing or ultra-high vacuum degrees.

Submerged Combustion Vaporizer (SCV) and Open Rack Vaporizer (ORV)

The (SCV) technology results in a consumption of fuel gas equal to about 1.5% of the processed gas and generates carbon dioxide which lowers the pH of the water bath, requiring treatments with caustic soda and thus causing an emission of $CO_2$ into the atmosphere of about 50,000 t/year in order to regasify 139 t/h of LNG.

With regard instead to the Open Rack Vaporizer (ORV), such a technology may partially cause the freezing of the seawater in the outer part of the pipes, especially in the sections in which the LNG is colder; moreover: i) it may be utilized in the geographical regions and/or in the seasons in which the temperature of the seawater is at least 5-9° C., mainly represented by the subtropical areas, ii) the seawater is to be processed beforehand to eliminate or reduce the content of the heavy metals which could corrode the zinc covering of the pipes, iii) it results in a consumption of electrical energy for operating the pumps for the seawater which is to exceed a geodetic difference of level equal to the development in height of the ORVs with additional consumptions of about 1 MWe per regasifying line with respect to the SCV technology (requiring a total power of about 20 MWe for a plant with four regasifying lines of 139 t/h each), iv) it results in an environmental impact in returning the colder and processed seawater, v) lastly, the technology is rather complex and available at a limited number of suppliers and of size.

A transcritical power generating cycle which employs $CO_2$ is depicted in FIG. 1.

Such a cycle does not take into consideration the employment of the LNG frigories, neither directly nor by means of intermediate fluids, with the following limitations:

given the critical temperature of the $CO_2$ (30.98° C.), if, as in literature, it is considered that the cycle employs a cold source at the ambient temperatures (air or cooling water coolers), such a power cycle hardly extends to the transition step, i.e. at the condensation temperatures of $CO_2$ to develop a transcritical cycle (Rankine-Brayton). Moreover, this does not allow a reasonable system stability:

given the high critical pressure of the $CO_2$ (73.8 bar A), the benefits due to the high temperature and input pressure to the expansion turbine are reduced by the smaller maximum expansion ratio attainable, and therefore by the power which can be extracted from the cycle;

also having available a cold well at lower temperature and desiring to utilize a very high maximum pressure (up to 300 bar A), the employment of a condensation pressure less than about 50 bar A (and therefore a condensation temperature less than 15° C.) would result in a much greater complexity of the (inter-refrigerated multi-stage) recompressor due to the too high compression ratio;

the systems operating with gaseous steps alone require significant storage volumes to manage the circulating flows.

In the case of an not-recovered supercritical/transcritical $CO_2$ topping cycle, the recuperator which lowers the temperature of the $CO_2$ to the benefit of the efficiency of the cycle itself is not output from the $CO_2$ turbine; therefore, the $CO_2$ still at a relatively high temperature is the thermal input for the ORC bottoming cycle.

Using a not-recovered $CO_2$ cycle thus means extracting mechanical energy in a poorly efficient manner from a system which would potentially be more efficient with a recuperator or recompressor. The thermal energy not used in the $CO_2$ cycle is sent to the ORC bottoming cycle, which would operate with a significant difference in temperature and therefore, an increased pressure ratio, making difficult the design of turbomachinery, to the benefit of a moderate increase in efficiency with respect to a $CO_2$ system.

Therefore, the conventional and/or already known technologies do not generally allow the electrical energy required for the plant to be generated and result in the loss of a large quantity of energy in the form of frigories.

SUMMARY OF THE INVENTION

The inventors of the present patent application have surprisingly found that there may be designed a power generating cycle employing an operating fluid, which may be employed for regasifying LNG, thus generating sufficient electrical energy to operate the plant.

Therefore, a first object of the invention is represented by a process for regasifying a fluid and for generating electrical energy.

In a second object it is described a regasifying line of the liquefied gas which allows generating electrical energy by utilizing the process of the invention, and a plant comprising such a line.

DETAILED DESCRIPTION OF THE INVENTION

Figure 1:
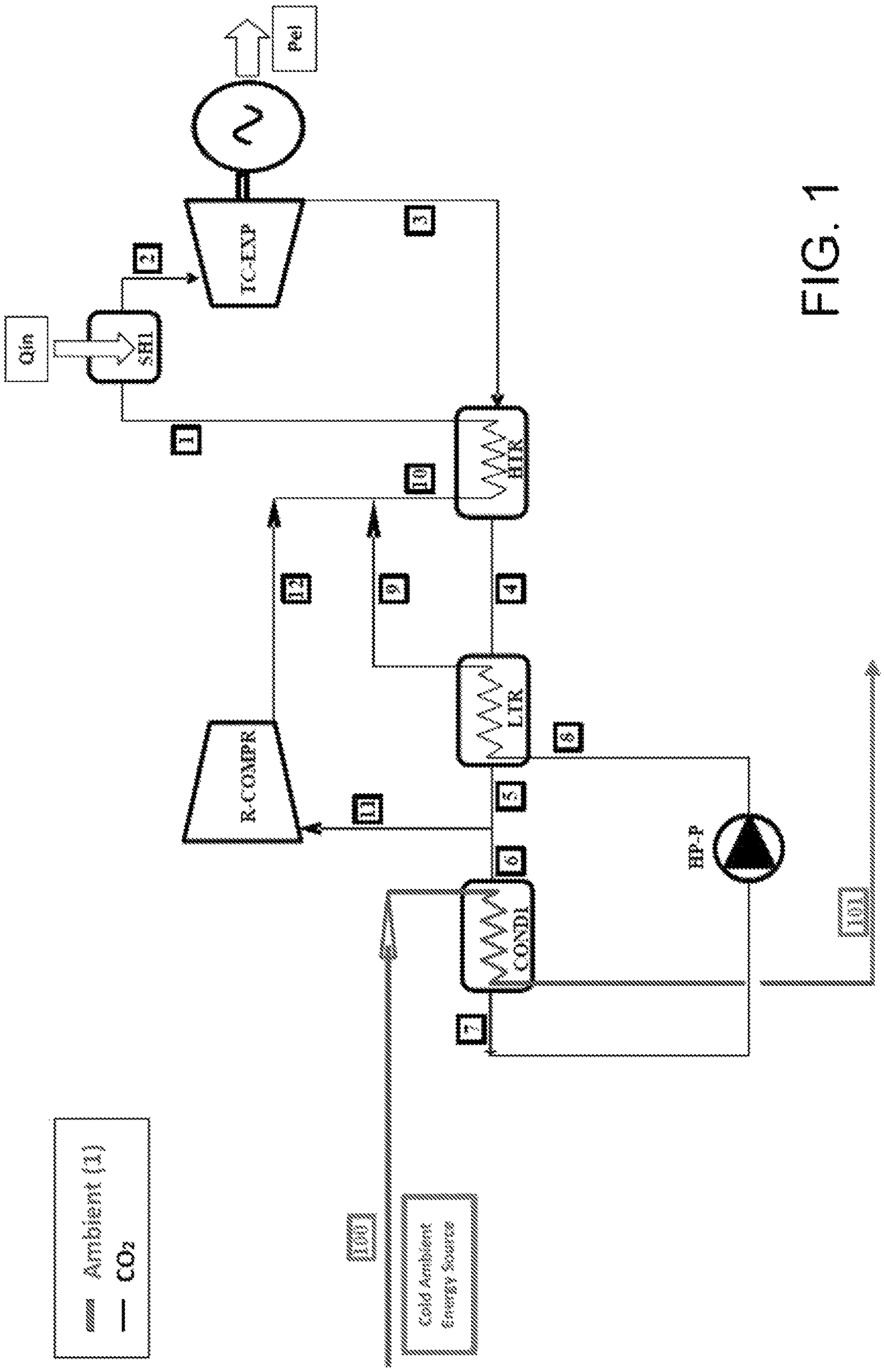
FIG. 1 shows the diagram of a Brayton Cycle under transcritical conditions according to the background art, which utilizes environmental fluid as a cold source for the liquefaction of the $CO_2$.

The present invention is particularly described in relation to regasifying liquefied natural gas (LNG), but it is equally applicable for regasifying or vaporizing other liquefied fluids stored at low temperatures (lower than about 0° C.) or at cryogenic temperatures (lower than −45° C.)

For example, the present invention is applied for regasifying a liquefied gas selected from the group which comprises, for example: air, nitrogen, commercially available hydrocarbon compounds such as alkanes, including for example propane and butane, or alkenes, including for example ethylene and propylene.

The terms "evaporation" and "vaporization", which are applicable to LNG, are to be intended as synonyms in the following description.

Moreover, "liquefied natural gas", later also referred to as "liquefied gas", in the present description means a liquid obtained from natural gas after suitable refining and dehydrating processes and next cooling and condensation steps.

More generally, "liquefied gas" in the present description means a fluid having a mainly liquid component.

Moreover, the term "low temperature heat source" in the present description means for example: ambient air, seawater, low temperature solar thermal, exhaust heat of a low temperature thermodynamic cycle, low temperature process and/or machinery heat recovery.

A low temperature source generally operates at temperatures, which are lower than 180° C., preferably lower than 120° C.

The term "high temperature heat source" instead means for example: high temperature thermal solar, exhaust heat of a high temperature thermodynamic cycle, exhaust gas of a gas turbine or internal combustion engine, high temperature process and/or machinery heat recovery.

A high temperature source generally operates at temperatures, which are higher than 180° C., preferably higher than 300° C., and even more preferably higher than 400° C. and beyond.

For the purposes of the present invention, it may be provided that the same low or high temperature heat source feeds several heating systems.

In the continuation of the description, the term "seawater" refers not only to seawater conveniently processed to remove sediments and conveniently pumped (for example at about 2 bar), but more generally, environmental water obtained from rivers, canals, wells, natural basins such as lakes, etc. and artificial basins.

For the purposes of the present invention, the operating fluid is $CO_2$.

For the purposes of the present invention, an intermediate operating fluid is a fluid capable of carrying out a heat transfer from one cycle to another.

Such an intermediate operating fluid may perform for example a heat transfer from a first power cycle (to which reference may be made as a topping cycle) and to a second power cycle (to which reference may be made as a bottoming cycle).

In one aspect of the invention, the bottoming cycle is a power cycle equal to the topping cycle.

In a preferred aspect, the intermediate operating fluid is different from the operating fluid of the topping cycle.

For the purposes of the present invention, an operating fluid is involved which is different from $CO_2$ and preferably is a gas or a gas mixture selected from the group comprising: hydrocarbons, nitrogen, $CO_2$ and coolants.

According to a first object, the present invention describes a process for regasifying a fluid to be regasified and for generating electrical energy.

As described above, such a fluid to be regasified preferably is LNG.

In a particular aspect of the present invention, the process comprises the employment of an operating fluid, which preferably is $CO_2$.

More in detail, the process comprises subjecting an operating fluid to the steps of:

1) pumping,
2) heating in a recuperator, thus obtaining a heated flow,
3) heating through a high temperature source, thus obtaining a further heated flow,
4) expanding in a turbine, with generation of electrical energy (through a generator), thus obtaining an expanded flow,
5) cooling in a recuperator, thus obtaining a cooled flow,
6) condensing said operating fluid flow.

For the purposes of the present invention, step 1) comprises a low pressure pumping sub-step 1a) and a high pressure pumping step 1b).

Step 1a) increases the pressure up to about 30 to 60 bar.

Step 1b) increases the pressure beyond about 150 bar.

More specifically, after the low pressure pumping step 1a), a portion of the flow of said operating fluid is subjected to a recompression step.

The recompression increases the pressure up to about 150 bar.

In a preferred aspect, said flow is subjected to a vaporization step I) prior to recompression.

With regards to step 2), said step comprises a low temperature heat recovery step 2a) (LTR) and a high temperature heat recovery step 2b) (HTR).

In particular, step 2a) increases the temperature up to about 200° C.

The flow of the operating fluid obtained after the recompression is then combined with the flow of the operating fluid obtained from step 2a) to be subjected to step 2b).

According to the present invention, the operating fluid is $CO_2$ and such an expansion step 4) is therefore a transcritical expansion step.

For the purposes of the present invention, step 5) is carried out in the same recuperator as step 2); indeed, the heat exchange of step 5) is carried out with the flow of steps 2b) (high temperature recovery or step 5a)) and 2a) (low temperature recovery or step 5b), respectively, and allows a cooled flow to be obtained.

As described above, the operating fluid may be $CO_2$; alternatively, an operating fluid may be employed mainly consisting of $CO_2$ with the addition of hydrocarbon/additive mixtures, which allow this fluid to be liquefied at higher temperatures than the ambient temperature or to the one of the available cold fluid.

Figure 2A:
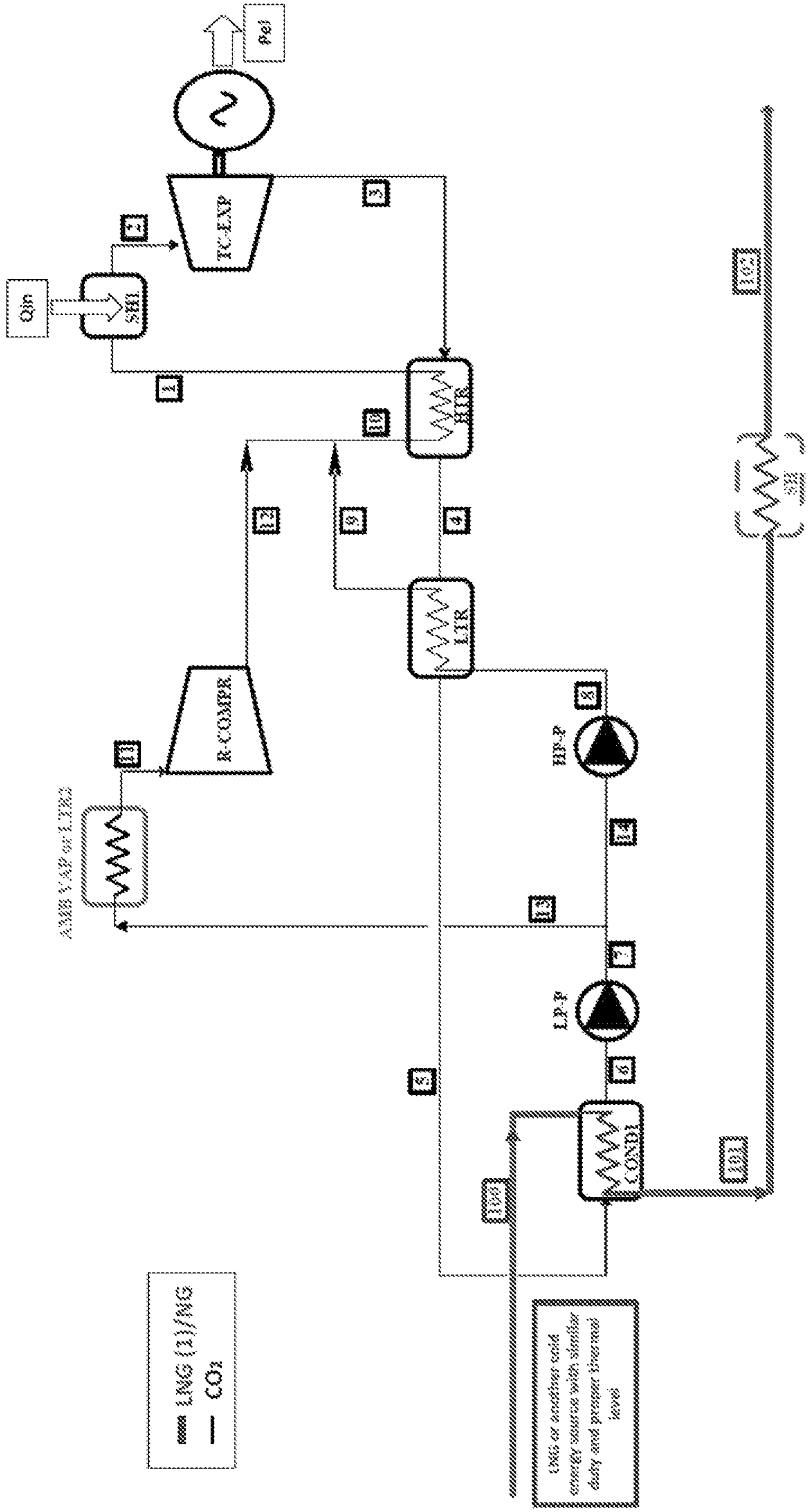
FIG. 2A shows the diagram of a first embodiment of the process of the present invention and, in FIG. 2B, a variant thereof comprising a bottoming cycle.

According to a first aspect of the invention schematized in FIG. 2A, the step 6) of condensing the operating fluid is the step in which the fluid to be regasified (e.g. LNG) is regasified by virtue of a direct heat exchange between the fluid to be regasified and the operating fluid.

In one aspect of the present invention, the above-described vaporization step I) may be carried out by employing a low temperature heat source, as defined above.

In another aspect of the present invention, the heating step 3) may be carried out by employing a high temperature heat source, as defined above.

According to another aspect of the present invention, the fluid to be regasified may be subjected to a superheating step after step 6).

In particular, said superheating step may be carried out by employing a low temperature heat source.

For the purposes of the present invention, the flow of operating fluid employed in steps from 1) to 6) of the described process is the flow of operating fluid obtained after the condensation step 6), thereby configuring a cycle.

Figure 3A:
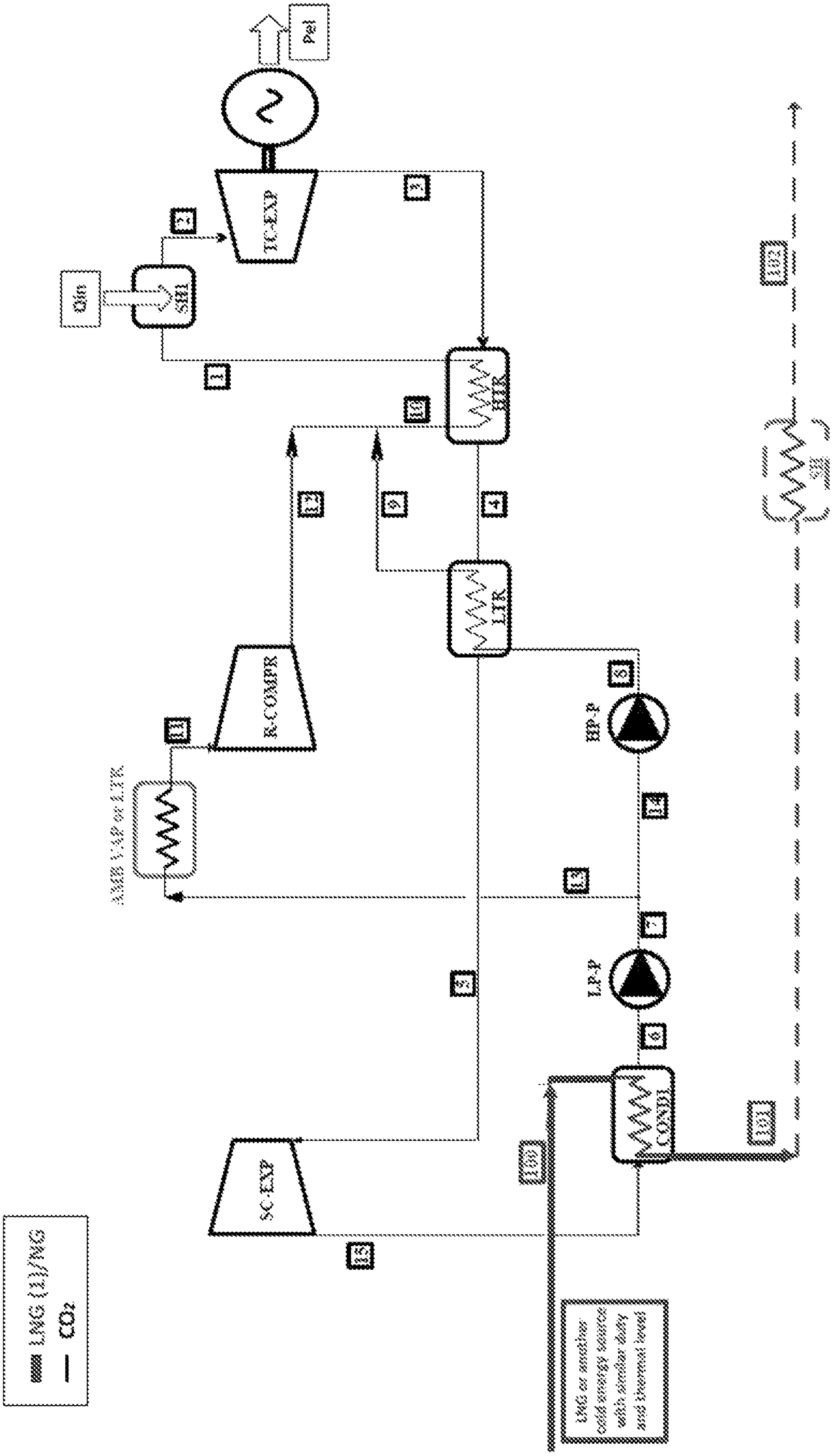
FIG. 3A shows the diagram of a second embodiment of the process of the present invention and, in FIG. 3B, a variant thereof comprising a bottoming cycle.

According to a second embodiment of the present invention depicted in FIG. 3A, after step 5) and prior to step 6), the process of the present invention comprises a further expansion step.

In a preferred aspect of the present invention, the operating fluid is $CO_2$ and therefore such a further expansion step is a subcritical expansion step.

Figure 2B:
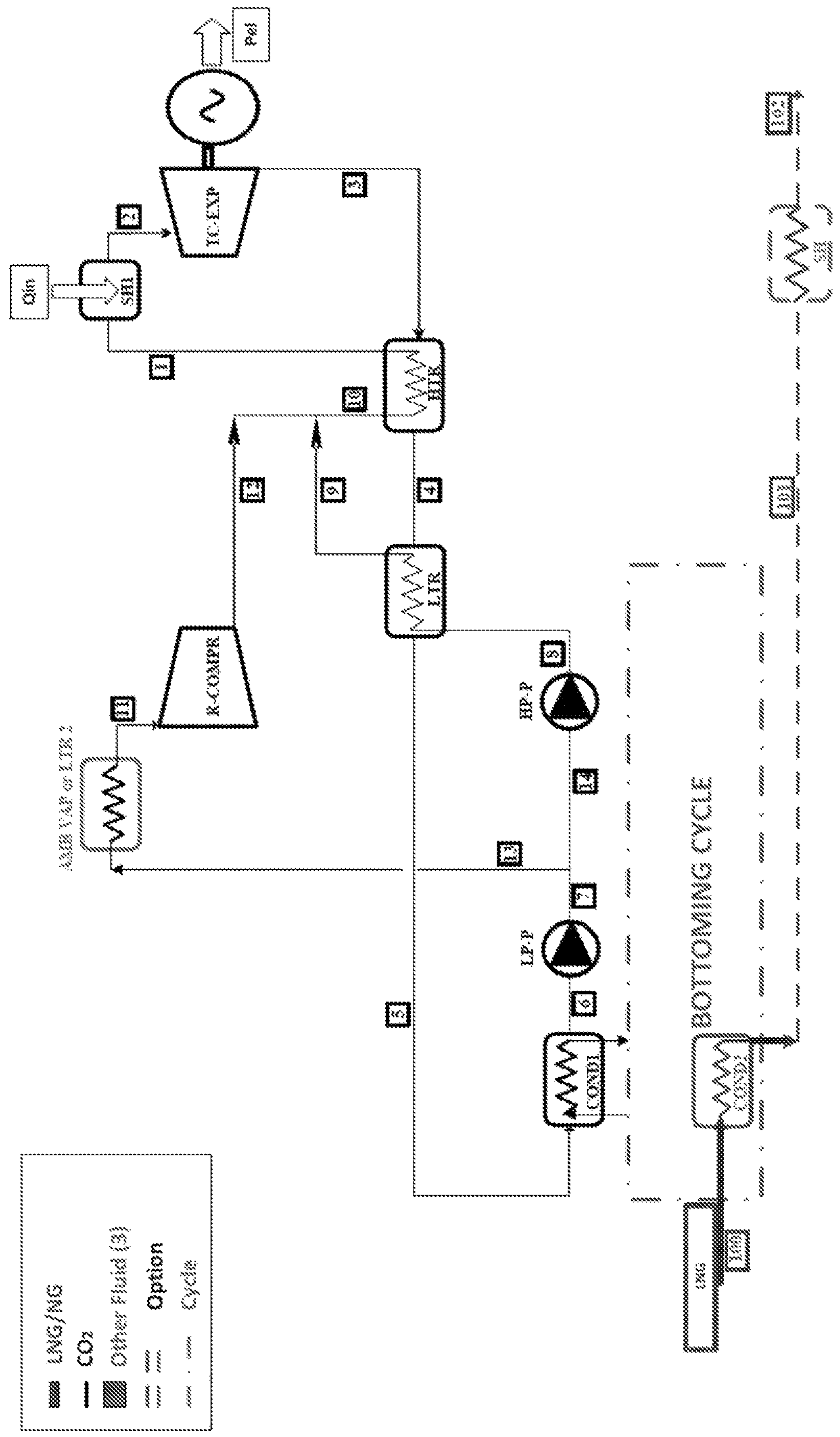
Figure 3B:
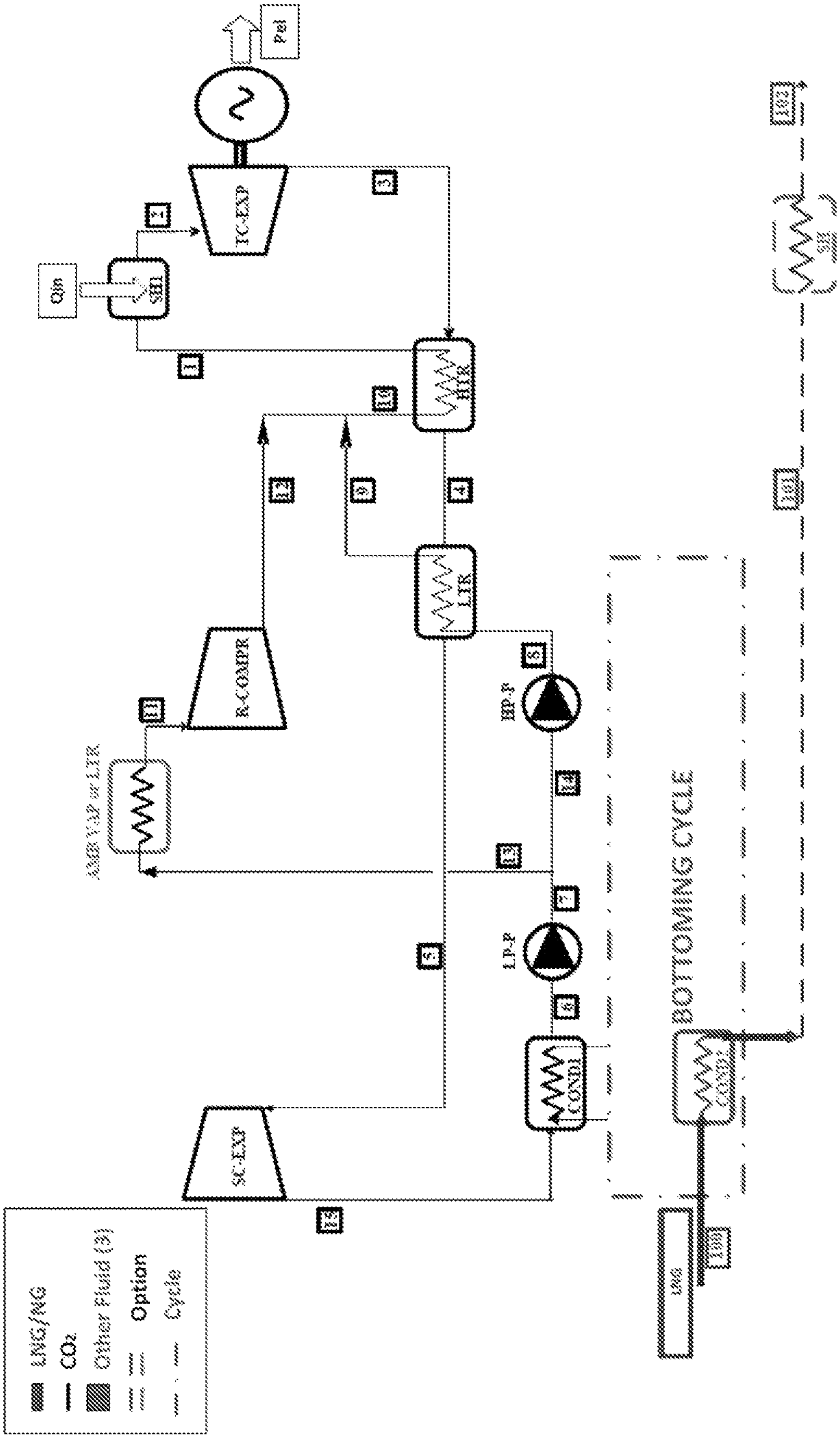
FIG. 3C depicts a variant for actuating the recompressor applied to the diagram in FIG. 3B.

According to an alternative embodiment of the present invention depicted in FIGS. 2B and 3B, the step 6) of condensing the operating fluid and regasifying the fluid to be regasified is carried out by indirect heat exchange between the operating fluid and the fluid to be regasified.

More specifically, such an indirect exchange occurs by means of an intermediate operating fluid, as described above.

Such an intermediate operating fluid circulates within a cycle, referred to as a bottoming cycle.

More in detail, said bottoming cycle comprises a first exchanger COND1 (which corresponds to the condenser of step 6) and which is the condenser of the topping cycle), inside of which the heat exchange is carried out between the operating fluid and said intermediate operating fluid which is thus heated, and a second exchanger COND2, inside of which the heat exchange is carried out between the intermediate operating fluid and the fluid to be regasified, to which heat is yielded.

For the purposes of the present invention, the vaporization step I) carried out prior to recompression, the heating step 3) and the possible superheating step of the fluid to be regasified are carried out by employing heat sources as described above.

Figure 3C:
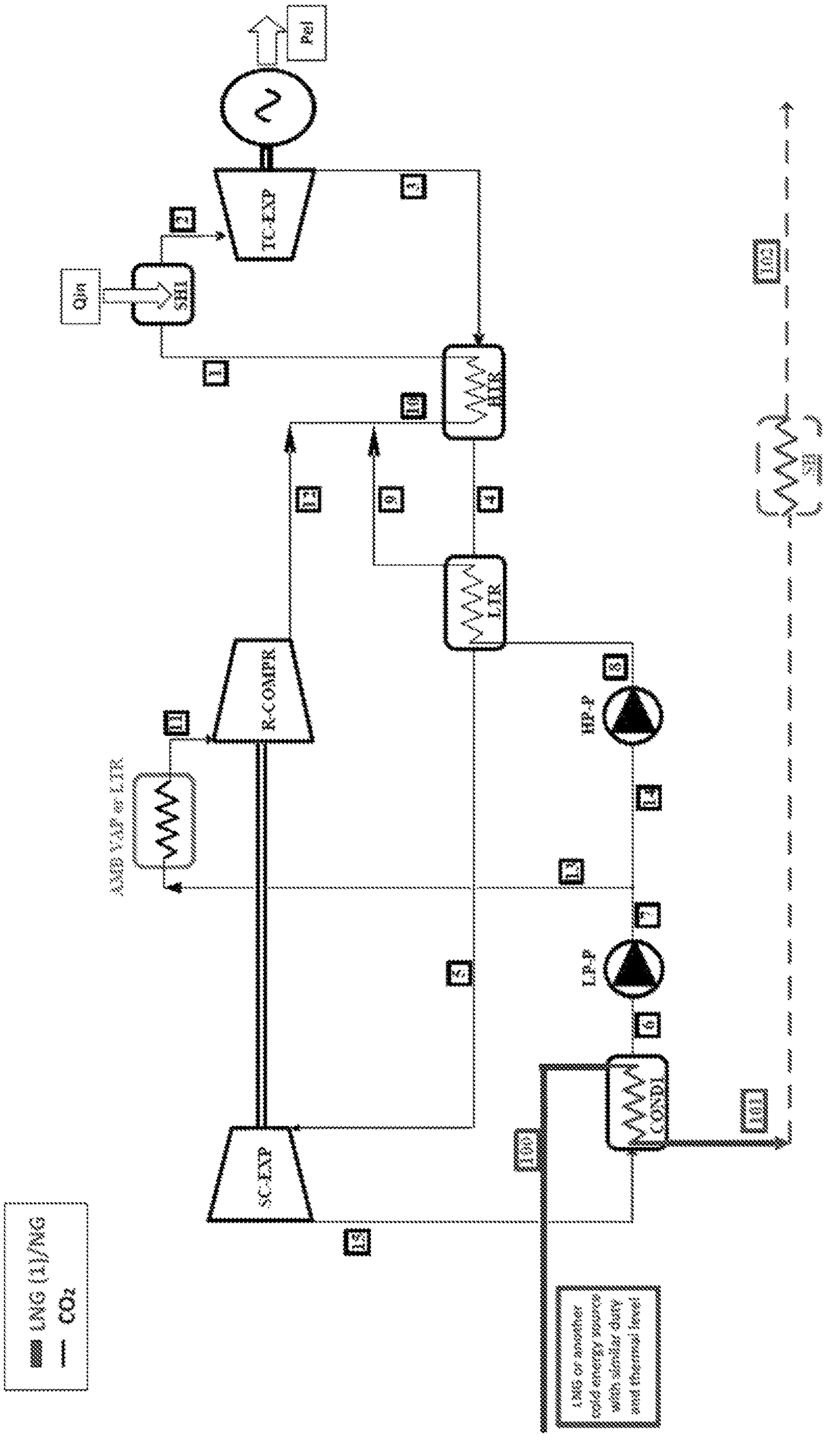

In one aspect of the present invention depicted for example in FIG. 3C, there may be provided a configuration of the turbomachinery, i.e. of the transcritical turbine of step 4), of the recompressor and of the subcritical turbine, so that the pressure of the end transcritical expansion may be conveniently set to actuate the generator, while the subcritical turbine actuates the recompressor.

Such a configuration, which may equally be applied also in the presence of a bottoming cycle FIG. 3B, has the advantage of simplifying the plant.

According to a further aspect of the present invention not depicted in the drawings, the turbine may actuate the low pressure pump and/or the high pressure pump.

For the purposes of the present invention, the described process may further comprise a step of regulating the circulating mass flow of $CO_2$ in the cycle, wherein the $CO_2$ is kept at the liquid state (also by virtue of the frigories provided by the cold source, and pressurized).

For this purpose, the plant may comprise a $CO_2$ storage tank.

Such adjustment advantageously allows the power of the cycle to be regulated.

According to a second object of the present invention, there is described a regasifying line for a fluid, preferably the liquefied natural gas (LNG) which allows generating electrical energy by means of the above-described process.

The term "regasifying line" means that independent and replicable portion of the plant that includes the structures, the equipment, the machinery and the systems for regasifying a given flow of the liquefied natural gas (LNG).

In particular, such structures, equipment, machinery and systems originate from the tank (TANK) in which the LNG is stored, and comprise cryogenic pumps, possibly low and high pressure pumps and a BOG compressor, which may be common to several regasifying lines, and a regasification section, and end with the regasified LNG introduction point into the distribution network of the gas itself.

For the purposes of the present invention, the regasification section is the condenser wherein step 6) of condensing the operating fluid and regasifying the fluid to be regasified occurs, according to the above-described process.

Alternatively, a regasifying line of the present invention may be provided in energy bypass configuration with respect to a traditional technology of an existing plant.

Figure 4:
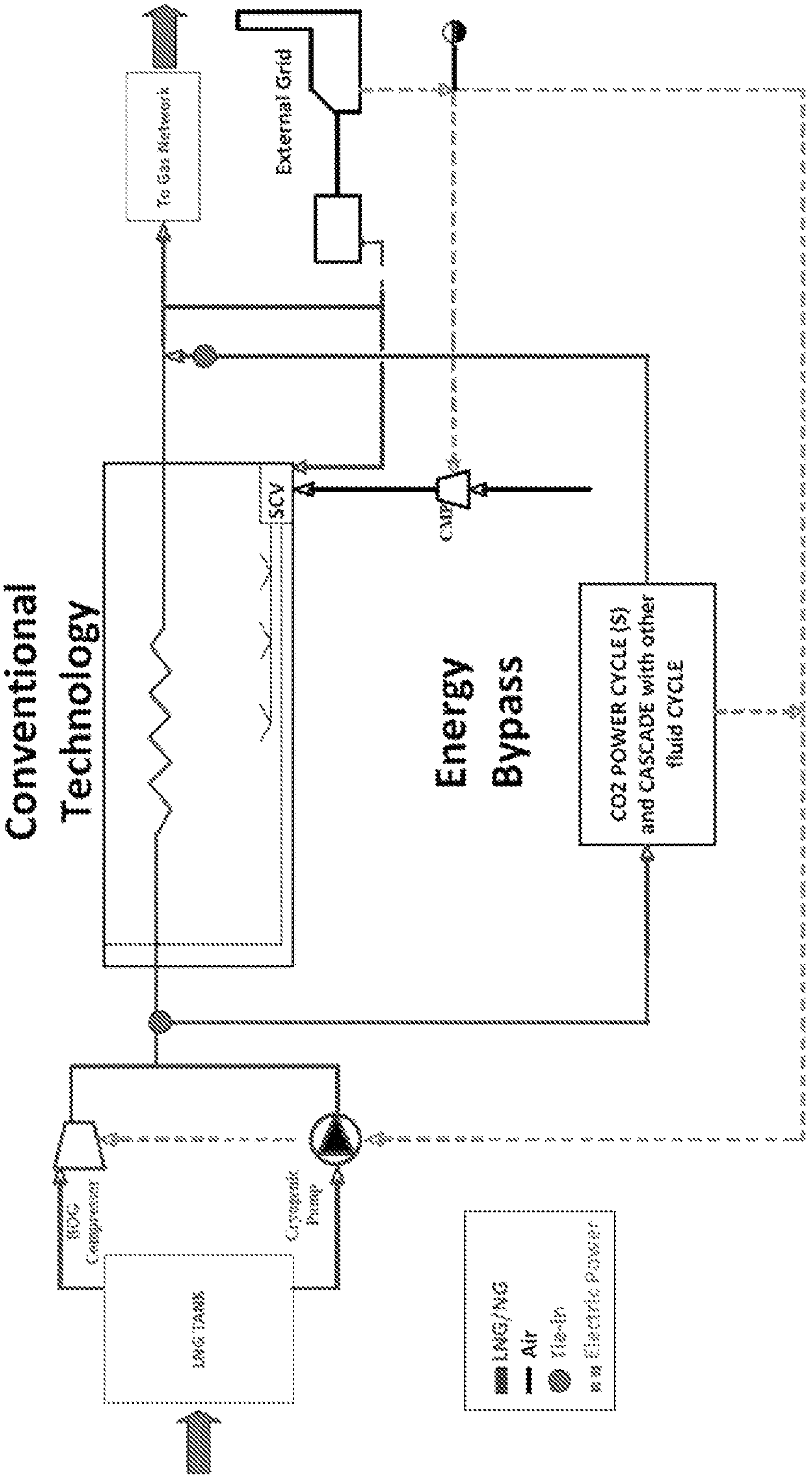
FIG. 4 shows the diagram of an LNG regasification plant which was modified by applying the technology of the present invention.

As shown in FIG. 4, the step 6) of condensing the operating fluid and regasifying the fluid to be regasified (e.g. LNG) is carried out on a portion of the LNG flow, while the remaining portion of LNG may be subjected to vaporization in a vaporization section according to the background art.

According to an alternative embodiment of the present invention, the power cycle described may be integrated with a conventional technology of SCV type. Here, a coil containing condensing $CO_2$ or a suitable fluid (such as, for example water-glycol) which exchanges heat with the condensing $CO_2$ heats the vaporization bath.

The layouts proposed may also be applied for making plants for regasifying technical gas (such as, for example hydrogen, air, nitrogen or other gas) or plants with low or cryogenic temperature fluid storages, also for cryogenic depots or storages.

When an export of electrical energy is not provided, to balance out the electric and heat loads, the power cycle may operate on a fraction of the LNG, regasifying the remaining fraction of LNG, with other systems and/or employing the surplus of electric power to feed air heating technologies.

In an alternative configuration, the $CO_2$ fraction which is not employed for regasifying LNG may be employed for achieving a cooling/liquefaction of the air by utilizing also a part of the electric power generated by the cycle itself, if required; thereby, in addition to obtaining a liquid air storage, nitrogen and oxygen may be obtained, and the latter may be employed to achieve a $CO_2$ cycle with internal oxy-combustion technologies.

The values indicated in the following section refer to a reference regasifying plant by way of explanation, but are in any case valid if considered as specific/unitary value.

Moreover, the results obtained in terms of extractible net electric power and thermodynamic efficiency of the cycle refer to a pressure of 100 to 250 or 150 to 350 bar and beyond A, and at a temperature of about 350° C. to 550° C. or 450° C. to 650° C., up to 700° C. and beyond, at the transcritical expansion turbine input, where applicable.

The diagram in FIG. 2A (recompression with partial pumping and ambient vaporization) is to be considered without the use of ambient heating means (SH) for regasifying the LNG flow.

$CO_2$ Circuit

The variation with respect to the diagram of the background art in FIG. 1 is that the expander (TC EXP) expands the fluid at a much lower pressure, compatibly with the minimum approach obtainable in COND1, less than 40 bar (3), thus succeeding in extracting a much higher specific work from the fluid. The fluid output from the heat exchangers (HTR and LTR) is desuperheated (5).

Then, it is not separated but is entirely sent to the condenser (COND 1), condensing at a lower pressure with respect to the diagram in FIG. 1: the temperature of the $CO_2$ is between −50° C. and 5° C. (6). Moreover, prior to being recompressed (in R-COMPR), after being pumped at an intermediate pressure, the $CO_2$ flow is vaporized through AMB VAP (11) with an available ambient means (i.e.: air, water) or with an available heat source at a low thermal level (e.g. boil-off compressor).

Indeed, the fluid is sent to a low pressure pump (LP-P) where it is pumped at a pressure between 30 and 60 bar (7), in any case corresponding to the evaporation temperature in (11).

The fluid is output from the low pressure pump divided into two flows. The first flow (14) is sent into a high pressure pump (HP-P) and is pumped at a pressure higher than 150 bar (8), then it is sent to the heat exchanger (LTR) where it is preheated at a maximum temperature of about 200° C. (9).

The second flow (13) is vaporized by the ambient heat to a variable ambient temperature between 0° C. and 30° C. through an air cooler (AMB VAP or LTR2) (11) and then is sent to the recompressor (R-COMPR) to be compressed at a higher pressure than 150 bar (12). This flow output from the recompressor is combined with the one (9) from the first heat exchanger (LTR) and is sent to the second heat exchanger (HTR) (10) to be further superheated (1).

The main results are: a net electric power up to 21.4 MWe, thermodynamic performance up to 62.2% (not considering the ambient heat in AMB VAP/LTR2), employing a total circulating $CO_2$ of 294.6 t/h.

LNG Circuit 123.61 t/h of LNG are drawn at the temperature of −156.6° C. and at a pressure of 90.5 bar A (100). Then, the LNG receives heat in COND 1 (24.34 MWt), reaching the temperature of 2.5° C. (101).

If the employment of a seawater circuit is provided (optional for the vaporization of the $CO_2$, not depicted in the drawings), an (optional) seawater circuit may be integrated in the $CO_2$ cycle to provide the heat duty required at AMB VAP to vaporize the $CO_2$.

With reference to the above-described case, 1828.44 t/h of seawater at the temperature of 30° C. and at atmospheric pressure are drawn at the seawater intake and pumped at the pressure of about 2 bar A by means of a pump. The flow is then fed to the $CO_2$ AMB VAP (10.61 MWt) vaporizer, where it is cooled by 5° C. and discharged into the sea, thus allowing the vaporization of the $CO_2$ at a pressure of 45.01 bar and a corresponding temperature of 10° C. (11) on the other side of the exchanger AMB VAP.

The main results in terms of net electric power and thermodynamic performance are entirely similar to those obtained in the above-described case, less the power required for pumping the seawater.

The same reference diagram in FIG. 2A is to be considered, with the option of employing ambient heating means for regasifying the LNG flow and the vaporization of the $CO_2$.

The circuit is the same, but the LNG is not entirely regasified, i.e. up to a temperature of 2.5° C., by means of the condensation of the power cycle. Indeed, the remaining portion is regasified through an ambient means, which may be seawater. Moreover, it is employed for the vaporization of the $CO_2$ in AMB VAP (also described in the option indicated in the above-indicated case).

$CO_2$ Circuit

With respect to the diagram in FIG. 2A where the employment of the heating means SH is not provided for, in addition to the extensive properties (e.g. flow rates, split at the recompression), the main differences are that the expansion pressure is different: in particular, the pressure prior to the condensation of the $CO_2$ which is the lowest possible, compatibly with the formation of carbon dioxide in the solid state and therefore, at the limit of 8.318 bar, corresponding to −45° C. Therefore, an increased thermodynamic efficiency of the cycle is obtained, which however requires the addition of a system for heating the LNG through an ambient means with the related circuit. The main results are: a net electric power up to 18.7 MWe and thermodynamic performance up to 68.2%, employing a total circulating $CO_2$ of 179.2 t/h.

LNG Circuit

The output temperature of the natural gas (LNG regasification) is lower given that it is heated with the $CO_2$ cycle through the same condenser (COND 1) with a variable temperature reached between −55° C. and 0° C. (101). Therefore, a further superheating fluid is required to heat the natural gas at the required temperature, included between 0 and 10° C. (in the particular case, of 2.5° C.). For this purpose, the natural gas is sent into an ambient air cooler or into an optional seawater circuit (102).

With respect to the above-described circuit (diagram 3A without the dotted section), the LNG is not entirely vaporized up to the temperature of 2.5° C. through the heat exchange with the $CO_2$ in COND1. The following description is consistent with the balance indicated above.

123.61 t/h of LNG are drawn at the temperature of −156.6° C. and at a pressure of 90.5 bar A (100). Then the LNG receives heat (17.4 MWt) if, as indicated above, the pressure $CO_2$ circuit side to the flow (6) is equal to 8.318 bar in COND1 up to reaching a temperature of −46° C. (101). The remaining part of the vaporization, which is dependent on the preceding heat exchange in COND1, is completed in the heater SH where the LNG receives heat from the seawater circulating in a dedicated circuit and reaches a temperature of 2.5° C. (102).

Seawater Circuit (not Depicted in the Drawings)

A seawater circuit is installed to provide, downstream of COND1, the remaining heat required for the vaporization of the LNG up to 2.5° C. Moreover, it may (optionally) be integrated in the $CO_2$ cycle to provide the heat duty required to vaporize the $CO_2$ in AMB VAP and it requires being integrated.

With reference to the actual above-described case, 2681.39 t/h of seawater at the temperature of 30° C. and at an atmospheric pressure are drawn at the seawater intake and pumped at the pressure of about 2 bar A by means of a pump. Of this flow, a part, i.e. 1485.31 t/h, of seawater are (optionally) fed to the vaporizer AMB VAP (8.62 MWt) where they are cooled by 5° C., thus allowing the vaporization of the $CO_2$ at a pressure of 45.01 and a corresponding temperature of 10° C. (11) on the other side of the exchanger AMB VAP. The remaining flow, i.e. 1196.08 t/h of seawater, instead is fed to the heater SH (6.94 MWt) where it is cooled by 5° C., thus allowing the vaporization of the LNG from the temperature obtained at the output of COND1 up to reaching a temperature of 2.5° C., not obtained with the condenser COND1 alone. It therefore is mixed with the flow output from AMB VAP and is discharged into the sea at the temperature of 25° C.

Alternatively, as shown in diagram 2B, the cycle in FIG. 2A is employed in a cascade. It is a topping cycle, which does not directly exchange heat/frigories with the LNG flow, rather with a bottoming cycle (the details of which are not shown in the drawings). The circulating fluid in the bottoming cycle is different from the $CO_2$ but allows the $CO_2$ of the topping cycle to be condensed and the LNG to be regasified is simultaneously condensed. This allows increasing the overall efficiency by virtue of an increased adherence in COND2 of the condensation curve of the fluid circulating in the bottoming cycle at the vaporization curve of the LNG to be regasified. The system is more complex from an engineering viewpoint.

It is worth noting the reference diagram in FIG. 3A (recompression with partial pumping, ambient vaporization and subcritical post-expansion).

$CO_2$ Circuit

The diagram provides for the operating fluid at the output of the heat exchangers (HTR and LTR, where the fluid is desuperheated (5)) to be further expanded in SC-EXP (15) prior to being fed to COND1.

FIG. 3B depicts a variation of the diagram in FIG. 3A, in which the cycle in FIG. 3A is employed (as described above in relation to FIG. 2B) in a cascade as topping cycle, which does not directly exchange heat/frigories with the LNG flow, rather with a bottoming cycle (the details of which are not shown in the drawings).

The advantages offered by the present invention are apparent to a person skilled in the art from the description above.

Considering the conventional regasification technologies, the main advantages of the solution appear to be:

- reduction of the consumption of fuel gas with respect to the SCV technology, the advantage expressed in terms of Fuel Gas Saving (FGS)=(Gas cycle consumption−SCV or ORV consumption)/SCV or ORV consumption [%] up to 60% (30%) with energy surplus availability;
- reduction of the $CO_2$ emissions up to 60% (30%), (proportionately to the reduction of the fuel gas consumption, with respect to a conventional SCV and ORV technology);
- generating electrical energy may be employed to meet the plant needs and for exporting the same;
- specific technical problems are avoided or significantly reduced both for the above-mentioned ORV and for SCV;
- all the advantages associated with the employment of carbon dioxide as operating fluid can be utilized: low freezing point, stability.

Moreover, more in detail, the following was positively noted:

- the availability of a cold well, represented by the LNG or other technical gas to be regasified or by a storage at low or cryogenic temperatures, which allows the $CO_2$ to be liquefied at different pressures, thus obtaining (Brayton-Rankine) transcritical $CO_2$ power generating cycles, with significantly greater efficiency than the $CO_2$ (supercritical) Brayton cycles;
- the employment of a pump for compressing the condensed $CO_2$ allows a reduction of the power required by the cycle and of the plant cost to be obtained with respect to the employment of the primary compressor required in the supercritical $CO_2$ Brayton cycles;

engineering simplicity, especially for retrofitting existing plants, the $CO_2$ power cycle may be integrated in a conventional SCV technology, as described above;

the possibility of including a $CO_2$ storage tank (not depicted in the drawings) allows regulating the power of the cycle by regulating the circulating mass flow in the cycle, where the $CO_2$ is kept in the liquid state also by virtue of the frigories provided by the cold source, and pressurized: this allows a given operating flexibility to be obtained also in the startup and stop steps and in potential emergency scenarios; and it simplifies designing the storage tank, which may operate at lower pressures and with smaller volumes.

More specifically, with respect to the $CO_2$ transcritical power generating cycles, the following advantages can be recognized:

the $CO_2$ transcritical power generating cycles allow the expansion from high pressures in supercritical step to low pressures in subcritical step, under condition of condensing the $CO_2$ at low temperatures, using the LNG or a fluid with adequate thermal level as cold well, by means of one or more expansion turbines, utilizing the specific high work of the fluid at high pressures: by allowing an increased expansion ratio of the turbines, this generates sufficient power to feed the utilities of the LNG regasification plant or also a surplus of electric power generated available to feed possible external utilities;

the optimization of the transcritical $CO_2$ cycle allows an increased share of frigories available during the LNG vaporization to be used and drastically reduces the consumption of energy required to regasify the LNG.

With reference to the drawings in FIGS. 2A and 2B, in particular:

given that the division of the flow occurs downstream of the condensation step, all the operating fluid exchanges heat/frigories with the LNG; therefore the embodiment is best adapted to regasifying the LNG with respect to others, thus obtaining an increased thermodynamic efficiency and a decreased circulation in the power cycle, with an increased specific work, which potentially reduces the sizes of the system and the consumption thereby of fuel gas (the net extractible power however is less due to the smaller circulating flow);

the first pumping at an intermediate pressure makes available a fraction of the operating fluid at the most suitable pressure for the recompression, thus allowing the recompression in one turbomachine alone, limiting the compression ratio, and together with the LTR, best utilizing the available low temperature thermal source.

With reference to the drawings in FIGS. 2B and 3B, in particular:

these cycles may be employed as topping cycle of a cascade configuration with a bottoming cycle which in turn regasifies the LNG.

Overall, the cascade power generating cycles may be combined so as to best utilize the features and constraints thereof to the advantage of regasifying the LNG, thus improving the employment of the frigories (vaporization curve). Although they have increased engineering complexity, they allow the overall plant efficiency to be improved.

In the case of a $CO_2$ topping cycle and a bottoming cycle with fluid different from $CO_2$ as described above:

the condensation of the $CO_2$ is carried out by means of the vaporization of the fluid in the bottoming cycle which occurs at temperatures which are compatible with the solidification of the $CO_2$ and which condenses, recuperating the LNG frigories with a more efficient LNG vaporization curve and the possibility of recuperating all the frigories available in the LNG;

the addition of the topping cycle allows the extraction of increased power with respect to the system with only bottoming cycle and the possibility of best utilizing the available heat sources, especially if at high temperature, thus allowing the recuperation of this heat to be distributed between the two cycles; in particular, the range of condensation temperatures of the $CO_2$ (between the triple point at −56.56° C. and the critical temperature of +30.98° C.) allows a bottoming cycle with organic fluid to be coupled in an optimal manner to one of the innovative $CO_2$ cycles proposed in this paper and to optimize the pressure jumps in the two-cycle turbines.

Moreover, the $CO_2$ topping cycle is a supercritical/transcritical cycle with recuperator and recompressor, therefore the energy available at high temperature is utilized well in a high efficiency topping cycle, instead designating the energy at lower temperatures (the one discharged from the top cycle) to the ORC bottoming cycle. The two cascade cycles ($CO_2$ topping cycle and ORC bottoming cycle) are optimized with the heat inputs in the temperature ranges appropriate thereto, with benefits to the overall efficiency and simplification in designing the turbomachinery.

All the embodiments of the invention may operate in configuration both of energy bypass at a conventional regasifying technology for an existing plant (as shown in FIG. 4, for example), with the advantage of making the plant more efficient through a retrofit, increasing the flexibility and availability thereof, and as replacement of the conventional technology in the case of a new plant and/or as an alternative plant, with the advantage of obtaining an increased plant production ("de-bottlenecking").

What is claimed is:

1. A process for regasifying a fluid and generating electrical energy, said process comprising subjecting a flow of an operating fluid to the following steps:

1) pumping, said pumping step comprising a low pressure pumping step 1a) using a low-pressure pump and a high pressure pumping step 1b) using a high-pressure pump, 2) heating in a recuperator, thus obtaining a heated flow, said heating step comprising a low temperature heat recovery step 2a), thus obtaining a first heated flow, and a high temperature heat recovery step 2b), thus obtaining a second heated flow, 3) further heating through a high temperature source, thus obtaining a further heated flow, 4) expanding in a turbine, with generation of electrical energy, thus obtaining an expanded flow, 5) cooling in a heat recuperator by heat exchange, in a step 5a) with the second heated flow of step 2b), and in a step 5b) with the first heated flow of step 2a), thus obtaining a cooled flow, and 6) condensing said cooled flow of said operating fluid to regasify said operating fluid, wherein after the low pressure pumping step 1a), a portion of the flow of said operating fluid output from the low-pressure pump is subjected to a recompression step, thus obtaining a flow which is combined with the first heated flow of the operating fluid obtained from step 2a).

2. The process of claim 1, wherein the portion of the flow of said operating fluid output from the low-pressure pump is subjected to a vaporization step prior to said recompression step.

3. The process of claim 2, wherein said vaporization step is carried out by a low temperature heat source.

4. The process of claim 1, wherein step 3) is carried out by a high temperature heat source.

5. The process of claim 1, wherein an expansion step is carried out after step 5) and prior to step 6).

6. The process of claim 1, wherein step 6) is carried out by heat exchange with said operating fluid.

7. The process of claim 1, wherein step 6) is carried out by heat exchange by an intermediate fluid which acquires heat in step 6) and releases heat to said operating fluid.

8. The process of claim 1, wherein a step of superheating said operating fluid is carried out after step 6).

9. The process of claim 8, wherein said superheating step is carried out by a low temperature heat source.

10. A liquefied natural gas (LNG) regasification line comprising a regasification section for performing a process for regasifying a fluid and generating electrical energy, said process comprising subjecting a flow of an operating fluid to the following steps:

1) pumping, said pumping step comprising a low pressure pumping step 1a) using a low-pressure pump and a high pressure pumping step 1b) using a high-pressure pump, 2) heating in a recuperator, said heating step comprising a low temperature heat recovery step 2a), thus obtaining a first heated flow, and a high temperature heat recovery step 2b), thus obtaining a second heated flow, 3) further heating through a high temperature source, thus obtaining a further) heated flow, 4) expanding in a turbine, with generation of electrical energy, thus obtaining an expanded flow, 5) cooling in a heat recuperator by heat exchange, in a step 5a) with the second heated flow of step 2b), and in a step 5b) with the first heated flow of step 2a), thus obtaining a cooled flow, and 6) condensing said cooled flow of said operating fluid to regasify said operating fluid, wherein after the low pressure pumping step 1a), a portion of the flow of said operating fluid output from the low-pressure pump is subjected to a recompression step, thus obtaining a flow which is combined with the first heated flow of the operating fluid obtained from step 2a), wherein at least step 6) of said process is carried out inside said regasification section.

11. A liquefied natural gas (LNG) regasification plant comprising one or more regasification lines according to claim 10.

* * * * *